F. H. CRAGO.
COMBINED WATER MOTOR AND PUMP.
APPLICATION FILED OCT. 2, 1917.

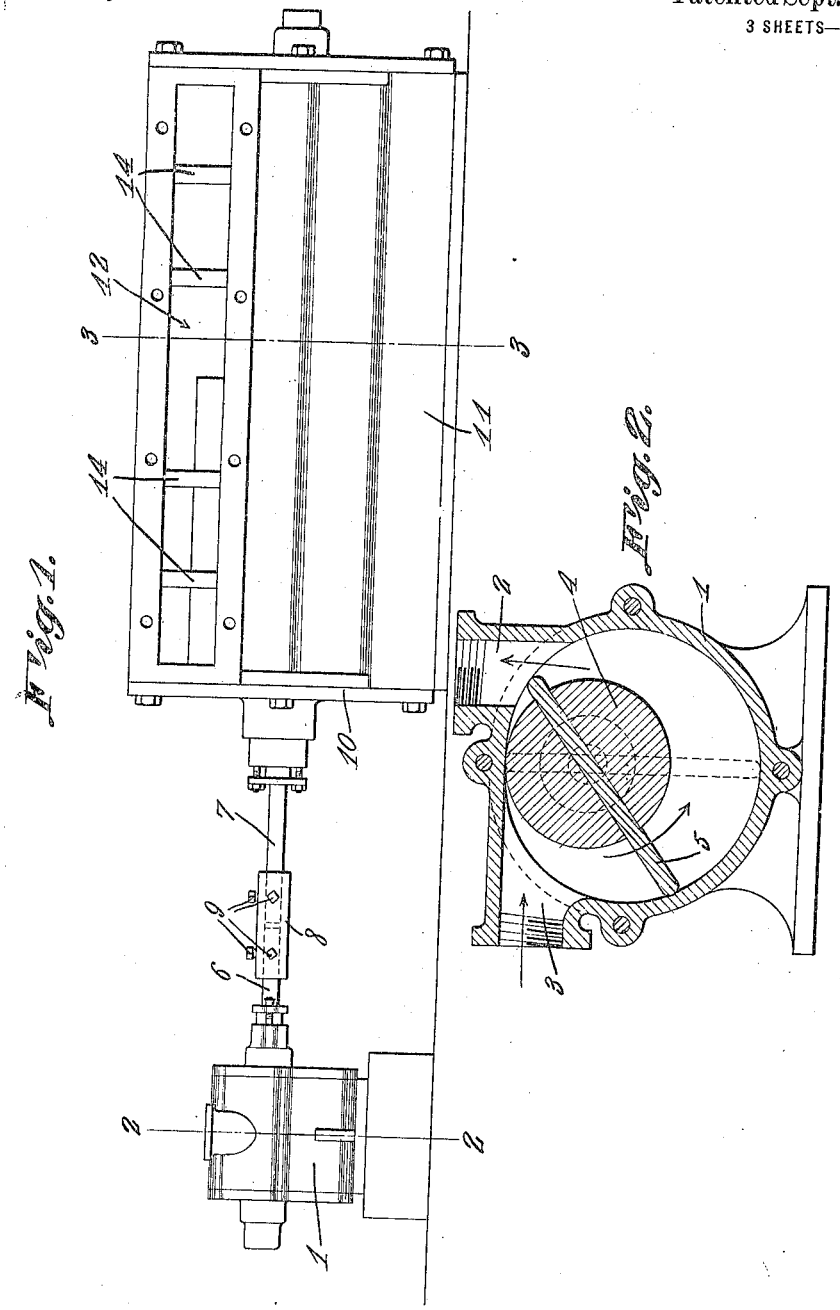

1,317,352.

Patented Sept. 30, 1919.
3 SHEETS—SHEET 2.

Witnesses

F. H. Crago, Inventor by

Attorneys

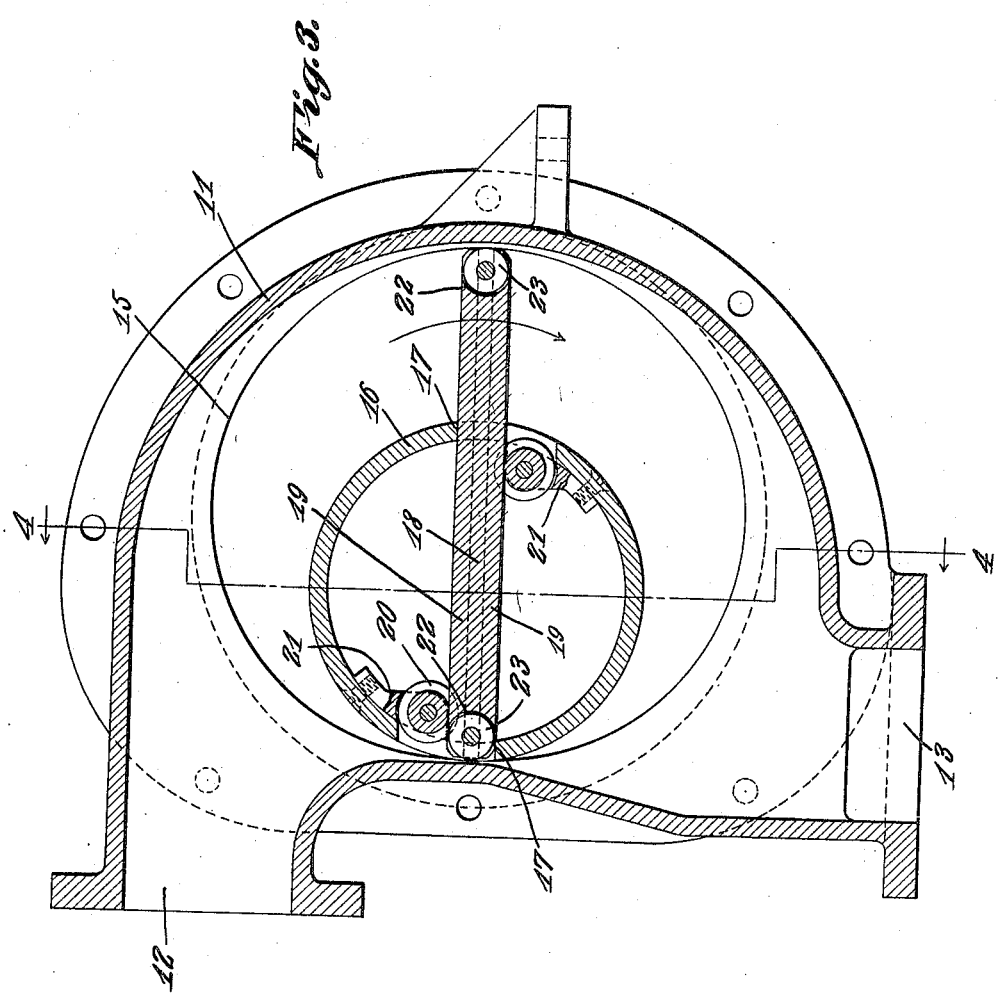

UNITED STATES PATENT OFFICE.

FELIX H. CRAGO, OF SAPPINGTON, MONTANA.

COMBINED WATER MOTOR AND PUMP.

1,317,352.  Specification of Letters Patent.  Patented Sept. 30, 1919.

Application filed October 2, 1917. Serial No. 194,357.

*To all whom it may concern:*

Be it known that I, FELIX H. CRAGO, a citizen of the United States, residing at Sappington, in the county of Gallatin and State of Montana, have invented a new and useful Combined Water Motor and Pump, of which the following is a specification.

This invention relates to water hoisting apparatus particularly designed for irrigation purposes, one of the objects being to combine in one unit, a novel form of water motor and a novel form of pump, the use of a large head of water in connection with the motor serving to operate the pump for the purpose of lifting a smaller quantity to a higher level.

A further object is to provide mechanism of this character which is simple in construction, will not readily get out of order, and the operation of which will not be interfered with by leaves or any other trash which may pass through the mechanism.

A further object is to provide a stator so shaped as to offer the minimum resistant to the movement of water through the apparatus.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

In the accompanying drawings, the preferred form of the invention has been shown.

In said drawings:

Figure 1 is a front elevation of a complete unit embodying the present improvements.

Fig. 2 is a section on line 2—2 Fig. 1.

Fig. 3 is an enlarged section on line 3—3 Fig. 1.

Figure 4:
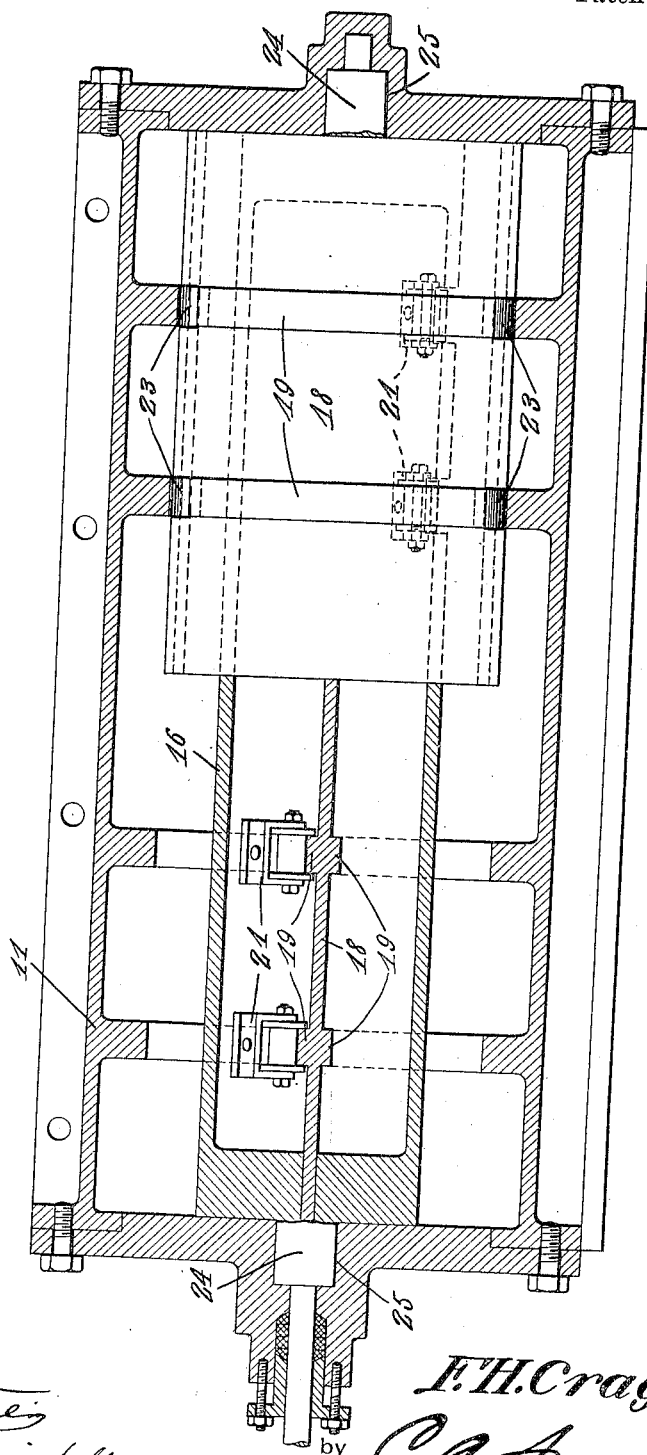
Fig. 4 is a section on the line 4—4 Fig. 3.

Referring to the figures by characters of reference, 1 designates the substantially cylindrical casing or stator of the pump portion of the unit, the same being provided with a tangential outlet 2 at the top thereof and a tangential inlet 3 also adjacent the top.

The rotor 4 of the pump is eccentrically mounted within the stator and the periphery of the rotor contacts with the top portion of the stator between the inlet and the outlet. A single blade or piston 5 extends diametrically through the rotor and is slidable therein, this piston being so proportioned and located that the opposed free edges thereof will at all times contact with opposed portions of the stator, so that the interior of the stator will be constantly divided into two noncommunicating compartments. Thus it will be seen that when the rotor is revolving in the direction indicated by the arrow in Fig. 2 water will flow back of the advancing end portion of the piston blade 5 until it becomes trapped by the positioning of the other end portion of the blade back of said advancing body of water, whereupon it will be impelled through the outlet 2 and forced to a higher elevation.

The rotor 4 has a shaft 6 extending from one side thereof and through one head of the stator, and this shaft alines with another shaft 7, the two shafts being coupled together by a sleeve 8 and set screws 9, or in any other manner desired.

Shaft 7 extends through one head 10 of the stator or casing 11 of the motor portion of the unit, this casing being necessarily of much greater capacity than the casing 1 of the pump portion of the unit and opening into the upper portion of the casing 11 is an inlet 12 extending throughout the length of the casing. An outlet 13 is provided in the bottom of the casing and extends throughout the length thereof. The inlet and the outlet are divided by webs or partitions 14 which extend into the casing and define elliptical openings 15 having a common center. Arranged within the openings 15 and extending from one head to the other of the stator 11 is a cylindrical rotor 16 of less diameter than the openings 15 and having its periphery constantly contacting with one wall of the stator between the inlet 12 and the outlet 13. The rotor 16 is preferably hollow and has pairs of diametrically opposed slots 17 extending longitudinally thereof. In each pair of these slots is slidably mounted a piston or blade 18 provided on each face with one or more transverse ribs 19. These ribs engage and travel upon grooved antifriction rollers 20 which are journaled in blocks 21 secured within the rotor close to the slots 17. Thus each blade is accurately guided in its movement diametrically within the rotor and friction is reduced because the rollers 20 are arranged where they will receive the thrust due to the pressure of water against the active or projecting portion of the blade or piston 18.

The outer or active edges of each piston or blade 18 are provided with recesses 22 adapted to receive the walls of the openings 15 and journaled within these notches are antifriction rollers 23 designed to travel along said walls. Thus frictional engagement between the piston or blade 18 and the webs or partitions 12 is reduced to the minimum. The blade or partition 18 is so positioned and proportioned that the opposed rollers 23 will constantly engage opposed portions of the walls of the openings 15. Furthermore when the blade is extended horizontally or at right angles to the plane of movement of the water through the outlet 13 said blade will contact with the stator at diametrically opposed points as shown particularly in Fig. 3. The two blades are preferably disposed at right angles to each other so as to be brought successively into action when moved into the path of the propelling medium.

For the purpose of holding the rotor properly positioned in the stator it is provided at the center of its ends with bearings 24 which are journaled within recesses 25 in the heads of the stator 11, and if preferred these bearings may be provided with any suitable antifriction means not shown.

From the foregoing description it will be obvious that when water is directed through the inlet 12 it will flow over the rotor 22 and against the active portion of the piston or blade 18 causing the same to move downwardly. As soon as the active portion of the blade or piston arrives at the outlet 13, the motive fluid will flow outwardly through the outlet 13. At this time the opposed portion of the blade or piston 18 will have been brought into position to receive the force exerted by the inflowing motive fluid. By providing the two blades 18 they are brought into action alternately, thus increasing the effectiveness of the motor. Each blade receives the full driving force of the propelling fluid every time each end thereof arrives at the position indicated at the right of Fig. 3 and as the two blades are arranged at right angles to each other the maximum pressure will be exerted on the rotor four times during each rotation.

Attention is called to the fact that that portion of the wall of the stator 11 extending from the inlet and around the rotor to the outlet is concentric with the rotor so that the inflowing motive fluid is not subjected to any appreciable resistance while flowing through the stator, other than that set up by the piston or blade 18.

By reason of the vast difference between the head of water passing through the stator 11 and that issuing from the stator 1 of the pump, a unit such as described will operate efficiently to lift water in desirable quantities for irrigation or other purposes. By providing the fins or webs 14 the blades or pistons 18 are positively actuated, and the propelling fluid is caused to travel in parallel paths or courses.

What is claimed is:

1. In apparatus of the class described a substantially cylindrical stator having a fluid inlet and a fluid outlet, a cylindrical rotor arranged eccentrically within the stator and having its periphery constantly in contact with the stator between and close to the inlet and the outlet, a blade slidably mounted within and extending diametrically through the rotor, there being an elliptical opening within the stator having opposed portions of its wall constantly engaged by opposed portions of the blade, said stator having a portion of its wall between the inlet and the outlet concentric with the rotor.

2. An apparatus of the class described including a substantially cylindrical stator having an inlet and an outlet, webs intersecting the inlet and outlet and extending into the stator, said webs having alining elliptical openings within the stator, a cylindrical rotor revolubly mounted within the stator and eccentrically disposed relative to said elliptical openings, said rotor having a portion of its periphery in constant contact with the stator close to and between the inlet and outlet, a blade slidably mounted within and extending diametrically through the rotor and having opposed portions constantly engaging opposed portions of the walls of the openings, the minimum distance between diametrically opposed portions of the walls of the stator being substantially equal to the width of the blade.

3. In apparatus of the class described, a substantially cylindrical stator having an inlet and an outlet, webs intersecting the inlet and outlet and extending through the stator in parallel planes, each of said webs having an elliptical opening therein, said openings alining, a rotor eccentrically mounted within the openings, said rotor being cylindrical and having a portion of its periphery in constant contact with the stator at a point between and close to the inlet and outlet, and a blade slidably mounted within and extending diametrically through the rotor and having opposed portions constantly engaging opposed portions of the walls of the openings.

4. In apparatus of the class described, a substantially cylindrical stator having an inlet and an outlet, webs intersecting the inlet and outlet and extending through the stator in parallel planes, each of said webs having an elliptical opening therein, said openings alining, a rotor eccentrically mounted within the openings, said rotor being cylindrical and having a portion of its periphery in constant contact with the stator at a point between and close to the inlet and outlet, and a blade slidably mounted within and extending diametrically through the rotor, and antifriction rollers carried by opposed portions of the blade and constantly engaging the walls of the openings in the webs.

5. In apparatus of the class described, a substantially cylindrical stator having an inlet and an outlet, webs intersecting the inlet and outlet and extending through the stator in parallel planes, each of said webs having an elliptical opening therein, said openings alining, a rotor eccentrically mounted within the openings, said rotor being cylindrical and having a portion of its periphery in constant contact with the stator at a point between and close to the inlet and outlet, and a blade slidably mounted within and extending diametrically through the rotor, said blade constantly engaging opposed portions of the walls of the opening in the webs, and antifriction devices within the rotor for receiving thrust from the blade.

In testimony that I claim the foregoing as my own, I have hereto affixed my signature in the presence of two witnesses.

FELIX H. CRAGO.

Witnesses:
HENRY W. HOWELL,
EDWARD B. HOWELL.

Copies of this patent may be obtained for five cents each, by addressing the "Commissioner of Patents, Washington, D. C."